US008786835B1

(12) United States Patent
Reardon et al.

(10) Patent No.: US 8,786,835 B1
(45) Date of Patent: Jul. 22, 2014

(54) SYSTEM, APPARATUS AND METHOD FOR DETECTING PRESENCE AND RANGE OF AN OBJECT

(75) Inventors: Pete F. Reardon, Orlando, FL (US); Steve Preston, Winter Springs, FL (US); Kevin E. Keene, Orlando, FL (US); Wayne P. Parades, Clermont, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 208 days.

(21) Appl. No.: 13/429,585

(22) Filed: Mar. 26, 2012

(51) Int. Cl.
*G01C 3/08* (2006.01)

(52) U.S. Cl.
USPC ....... 356/4.01; 356/3.01; 356/3.09; 356/4.07; 356/5.01; 356/5.09; 356/9; 356/625

(58) Field of Classification Search
CPC ........ G01C 3/08; G01C 15/002; G01S 17/89; G01S 7/4817; G01S 17/42
USPC ........... 356/3.01–3.09, 4.01, 4.07, 5.01, 5.09, 356/9, 625
See application file for complete search history.

(56) References Cited

U.S. PATENT DOCUMENTS

| | | | | |
|---|---|---|---|---|
| 5,245,346 | A * | 9/1993 | Nishimura et al. | 342/42 |
| 5,864,391 | A * | 1/1999 | Hosokawa et al. | 356/4.01 |
| 6,543,694 | B1 | 4/2003 | Detwiler | |
| 6,822,743 | B2 * | 11/2004 | Trinh | 356/451 |
| 7,667,598 | B2 | 2/2010 | Yenisch et al. | |
| 7,992,785 | B2 | 8/2011 | Detwiler | |
| 8,251,514 | B2 * | 8/2012 | Murakami | 353/69 |
| 8,471,705 | B2 * | 6/2013 | Yenisch et al. | 340/555 |
| 8,591,165 | B2 * | 11/2013 | Chilson | 414/607 |
| 2003/0001835 | A1 * | 1/2003 | Dimsdale et al. | 345/419 |
| 2011/0221889 | A1 * | 9/2011 | Knox et al. | 348/135 |
| 2012/0183004 | A1 * | 7/2012 | Kupershmidt | 372/29.011 |
| 2013/0101159 | A1 * | 4/2013 | Chao et al. | 382/103 |

OTHER PUBLICATIONS

Joshua Andrew Strickon, Design and HCI Applications of a Low-Cost Scanning Laser Rangefinder, Submitted to the Department of Electrical Engineering and Computer Science at MIT, Jun. 1999.

* cited by examiner

*Primary Examiner* — Isam Alsomiri
*Assistant Examiner* — Samantha K Abraham
(74) *Attorney, Agent, or Firm* — Beusse Wolter Sanks & Maire, P.A.

(57) ABSTRACT

A multifunctional detector for emitting and receiving optical signals in order to determine the presence, location, and range movement of a player within a field of regard is disclosed. The detector generally includes a laser module operable for emitting an optical signal; an optional fiber optical delay line; a microcontroller/processor; a faceted scanning mirror pattern having multiple facets with each facet being tilted downward to allow for unique depressions for reflecting and scattering optical signals emitted by the laser module; a spinner/motor for driving and rotating the faceted mirror pattern; an optional combiner for separating emitted optical signals from the laser module or combining reflected optical signals from an reflective source; and a transceiver with an integrated APD receiver for receiving reflected optical signals combined from the combiner and transmitting reflected optical signal data to a central controller or other players. A method of using the detector is also disclosed.

8 Claims, 5 Drawing Sheets

FIG. 5 ns to provide a real-ing systems is that player tracking forces a variability in the scan depression angle if a single source is to be used. This is because the system's scanner must be positioned at a high elevation within a room or structure and a player may enter the room in a crouching position. Another restriction on current scanning systems is that multiple players within a room could shadow one another, thereby causing the system to have to re-identify a player after the shadowing is removed. Still another restriction on current systems is that player identification with a rangefinder is difficult or requires a substantial visible cue such as an encoded bar or similar element where intensity could be tested for reading. Still another restriction on current systems is that the angular resolution from a single site provides a less than desirable resolution the further the object or player is from the scanner. This could force an inappropriately high resolution and system speed for close
SYSTEM, APPARATUS AND METHOD FOR DETECTING PRESENCE AND RANGE OF AN OBJECT

FIELD OF DISCLOSURE

The present disclosure generally relates to the field of detecting the presence and range of an object, and more particularly, to an optical detector and rangefinder which can be part of a system for locating an object within a field of regard, and for determining the range to the object, wherein the detector can provide a high positional resolution.

BACKGROUND

Military organizations use a variety of military training techniques to instill skills into their members. One of the most effective types of military training is realistic training, otherwise known as war games. This type of training simulates actual combat scenarios and allows the participants to undergo a realistic combat experience. War games usually involve actual deployments of troops or players and vehicles into a limited area and include all of the movement and action that takes place during a real combat scenario but typically without that danger of live ordinance and ammunition.

In this regard, various systems have been developed to provide players with a realistic combat environment by attempting to provide a simulation system which records and tracks positional information relative to each player and some objects. Other systems have been developed which attempt to provide each player within a combat scenario with the positional information for the other players. More specifically, several simulation systems have been developed to provide active imaging of defined field of regard or rooms in an attempt to scan the room for player activity such as entry, exit and movement throughout the room. Such systems attempt to first determine the presence of an object or player and then the location or range. For instance, one known scanning system discloses a target detector which receives retro-reflected laser energy from an optical target. This known scanning system discloses that when a target is detected, a separate rangefinder with separate optics and detector can be pointed in a direction identified by the target detector to determine a range to the target. However, this known scanning system, as well as others, requires many components and a complex set up. Further, oftentimes such scanning systems are cost prohibitive and thus limit an organization's ability to provide a realistic environment.

Additionally, one of the restrictions of current scanning systems is that player tracking forces a variability in the scan depression angle if a single source is to be used. This is because the system's scanner must be positioned at a high elevation within a room or structure and a player may enter the room in a crouching position. Another restriction on current scanning systems is that multiple players within a room could shadow one another, thereby causing the system to have to re-identify a player after the shadowing is removed. Still another restriction on current systems is that player identification with a rangefinder is difficult or requires a substantial visible cue such as an encoded bar or similar element where intensity could be tested for reading. Still another restriction on current systems is that the angular resolution from a single site provides a less than desirable resolution the further the object or player is from the scanner. This could force an inappropriately high resolution and system speed for close targets to obtain the needed far distance resolution and either limit eye safety or reduce dynamic motion tracking speed.

SUMMARY OF THE DISCLOSURE

The present disclosure is designed to provide a continuously recalibrating system, apparatus and method for detecting the presence, location and range of a player or object within a combat training environment. In one example embodiment, the present disclosure relates to a system, apparatus and method for establishing "in-room" player presence, range and movement activity. In an example embodiment, a detection system is provided which includes a central controller; at least one multifunctional optical detector and rangefinder or three-dimensional, auto-correcting, scanning-rangefinder tracker module (TART unit) in signal communication with the central controller; and at least one player or object outfitted with a personal area network (PAN) cue and return device or a reflective label or component operable for reflecting an optical signal emitted from the TART unit. Optionally, a configuration unit may be provided and connected to the central controller for receiving collected data from the TART unit and building or rendering three dimensional images of a defined space or room based upon the data obtained from the TART unit.

In another example embodiment, the present disclosure provides a multifunctional optical detector and rangefinder or three-dimensional, auto-correcting, scanning-rangefinder tracker module (TART unit) operable for emitting and receiving optical signals in order to determine the presence, location, range and movement of a player or object within a specified area or field of regard. The TART unit generally includes a laser module operable for emitting an optical signal; an optional fiber optical delay line; a microcontroller/processor or control circuitry; a faceted scanning mirror for reflecting and scattering optical signals emitted by the laser module; a spinner/motor for driving and rotating the faceted scanning mirror; a lens element; an optional combiner for combining reflected optical signals from an reflective source or separating emitted optical signals from the laser module; and a transceiver having an integrated APD receiver for receiving reflected optical signals and transmitting reflected optical signal data to the microcontroller and in turn a central controller. In example embodiments, the faceted scanning mirror comprises six facets, each facet being tilted downward to allow for three angular depressions.

A method of detecting the presence, location and range of an object or player within a combat environment is also disclosed. The method generally includes the steps of 1) emitting from a laser module at least one pulsed optical signal which is reflected off a faceted scanning mirror through a lens element to scan a specified area within a room or structure for the presence of an object or player; 2) receiving at least one reflected optical signal from a player or object in the room or structure and transmitting data relating to the at least one reflected optical signal to a microcontroller; 3) determining the range of the player or object by analyzing the transmitted data; 4) transmitting or storing the transmitted data relative to the at least one reflected optical signal and 5) repeating the aforementioned steps. In exemplary embodiments, the at least one pulsed optical signal is routed through a fiber optical delay line to reduce blast noise from the laser module and separated via a combiner before being reflected off of the faceted scanning mirror. In still other exemplary embodiments, the range and presence of a player or object are determined using a time-of-flight technique for measuring the time that the at least one pulsed optical signal takes to emit out of the laser module, reflect off a target and return to a transceiver. In still other example embodiments, the range and presence of a player or object are determined by using a continuous wave phase technique.

Additional features and advantages of the disclosure will be set forth in the detailed description which follows, and in part will be readily apparent to those skilled in the art from that description or recognized by practicing the disclosure as described herein, including the detailed description which follows, the claims, as well as the appended drawings.

It is to be understood that both the foregoing general description and the following detailed description present example embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure, and together with the detailed description, serve to explain the principles and operations thereof.

BRIEF DESCRIPTION OF THE DRAWINGS

The present subject matter may take form in various components and arrangements of components, and in various steps and arrangements of steps. The appended drawings are only for purposes of illustrating example embodiments and are not to be construed as limiting the subject matter.

DETAILED DESCRIPTION

The present disclosure will now be described more fully hereinafter with reference to the accompanying drawings in which example embodiments of the disclosure are shown. However, this disclosure may be embodied in many different forms and should not be construed as limited to the embodiments set forth herein. These example embodiments are provided so that this disclosure will be both thorough and complete, and will fully convey the scope of the disclosure to those skilled in the art. Like reference numbers refer to like elements throughout the various drawings. Further, as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As indicated above, in attempting to provide detailed and realistic simulation data for combat training exercises, high resolution positional characteristics for detected players and objects is desirable. Further, determination of the players or objects range and in-room tracking is also desirable, as well as the direction a player or object is facing within a room or structure. However, it can be costly and difficult in establishing such high resolution positional characteristics and tracking of players and objects. As noted, whenever efforts have been afforded these characteristics within conventional systems, the set-up, instrumentation and operation of the system becomes complex and expensive.

The present disclosure overcomes these shortcomings and provides a system, apparatus and method for accurately and efficiently detecting the presence, location, direction and range of an object or player within a defined field of regard. The features of the present disclosure are beneficial over existing systems as they provide a low cost solution. Further, the features of the present disclosure are beneficial as they provide a multifunctional optical detector and rangefinder operable for providing high resolution positional data relating to a player or object within a field of regard, the high resolution positional data including long range data and short range data (e.g. within six inches of the multifunctional optical detector and rangefinder). The features of the present disclosure are further advantageous as they allow for automatic tracking of positions of players or objects down to six inches without the need for secondary elements.

The features of the present disclosure are further advantageous as they provide a detection system capable of use across substantial temperature ranges. The features of the present disclosure are further advantageous as they provide a detection and range finding apparatus which automatically and continuously recalibrates or auto-corrects itself after an initial set up phase. The present disclosure is further beneficial as it can provide elevation details along with tracking characteristics or players and objects within a field of regard. The features of the present disclosure are further beneficial as they allow for the production of a three dimensional image based upon information captured via variable scan angles. The features of the present disclosure are further beneficial as they are capable of use within a tactical training simulation which does not employ multiple integrated laser engagement system ("MILES") equipment.

Figure 1:
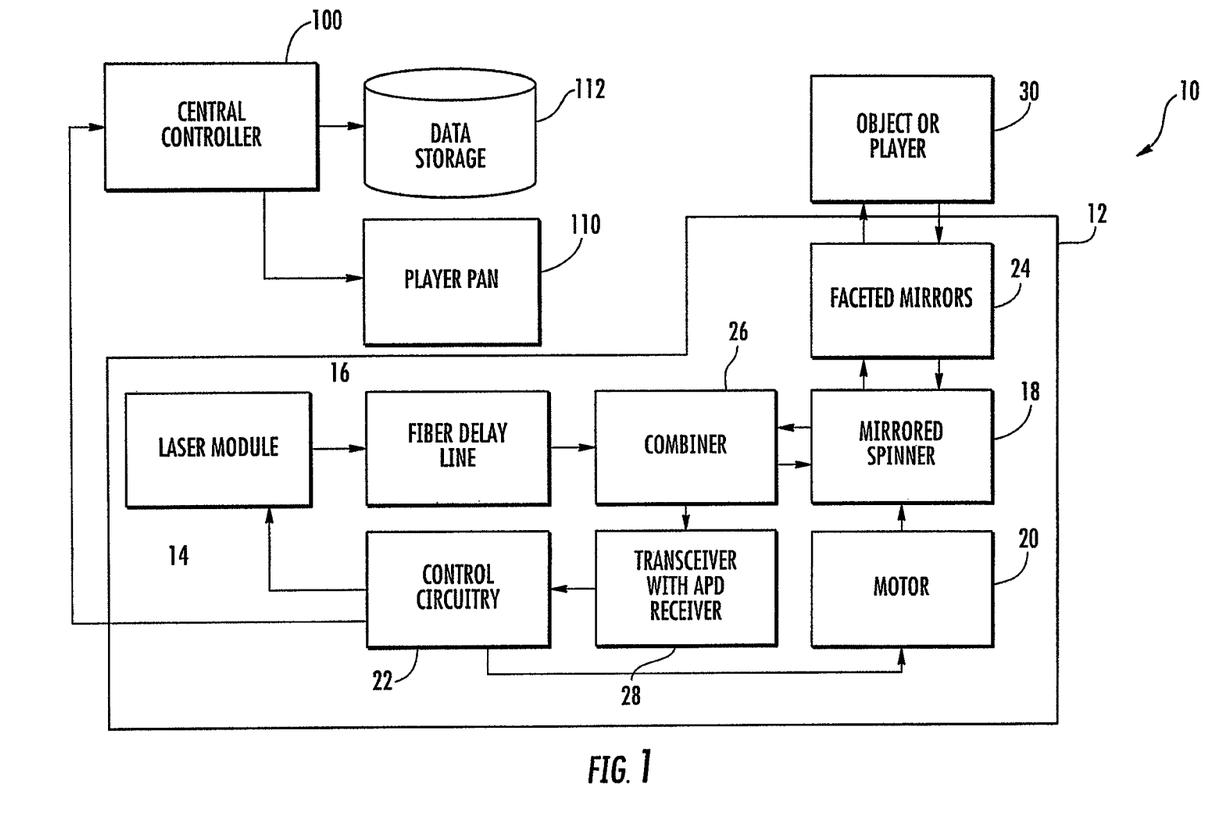
FIG. 1 illustrates a block diagram showing the system architecture, including a multifunction optical detector and rangefinder or three-dimensional, auto-correcting, scanning-rangefinder tracker module (TART unit), in accordance with one example embodiment of the present disclosure.

Referring now to the drawings and particularly FIG. 1, a block diagram showing the system architecture, including a multifunctional optical detector and rangefinder or three dimensional, auto-correcting, scanning-rangefinder tracker module (TART unit), in accordance with one example embodiment of the present disclosure is illustrated. As illustrated, the system 10 generally includes a central controller 100; at least one multifunctional optical detector and rangefinder or TART unit 12 in signal communication with the central controller 100 and being operable for detecting the presence, location and range of an object or player 30 within a specified area or field of regard and transmitting high resolution positional data relative to a player or object 30 to the central controller 100. The central controller 100 thereafter being operable for transmitting the high resolution positional data to a Personal Area Network (PAN) player device 110 or stored on a data storage 112 or memory device. Optionally, a configuration unit (not shown) may be provided and connected to the central controller 100 for receiving the high resolution positional data and building or rendering three dimensional images of a defined space or room.

Figure 2:
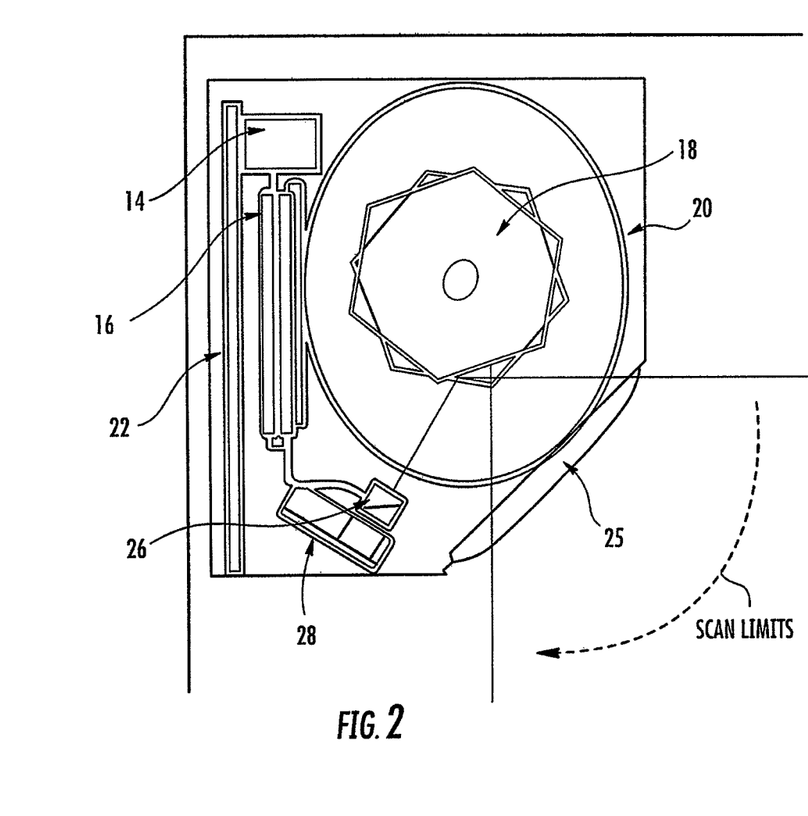
FIG. 2 illustrates a top view, schematic diagram of the TART unit of FIG. 1 according to an exemplary embodiment.

In an example embodiment and as best shown in FIG. 2, the TART unit 12 may be encased in a housing assembly 13 that may be constructed of plastic, a light metal such as aluminum, titanium, metal alloys, composite materials or any other material suitable for housing an electronic computing and radio system. The TART unit 12 may further include an edifice mount (not shown) that is used to mount the TART unit 12 onto a wall, a ceiling, a floor, a corner or any other fixture or portion of a room. In a room there is generally only required one TART unit 12. However, larger rooms can be instrumented with multiple TART units without adversely affecting the system characteristics. The edifice mount may be coupled to a portion of an edifice using a fastener such as a screw, a bolt, a nail or the like.

As shown in FIGS. 1 and 2, the TART unit 12 comprises an optical emitter or laser module 14 communicably linked to a microcontroller or control circuitry 22 and being operable for emitting an optical signal or beam along a first optical path. An optional fiber optic delay line 16 may be connected to the laser module 14 and operable for transmitting the optical signal and reducing noise generated by the laser module's 14 blast of an optical signal. The optional fiber optic delay line 16 may be communicably linked to an optional combiner 26 operable for separating an emitted optical signal or beam and dispersing a separated optical signal onto a mirrored spinner 18 having a plurality of faceted scanning mirrors 24 disposed thereon about the mirrored spinner's 18 rotational axis. In example embodiments where the optional fiber optic delay line 16 and the optional combiner 26 are not present, the laser module 14 emits the optical signal along an optical path which is directed to the mirrored spinner 18.

Figure 3:
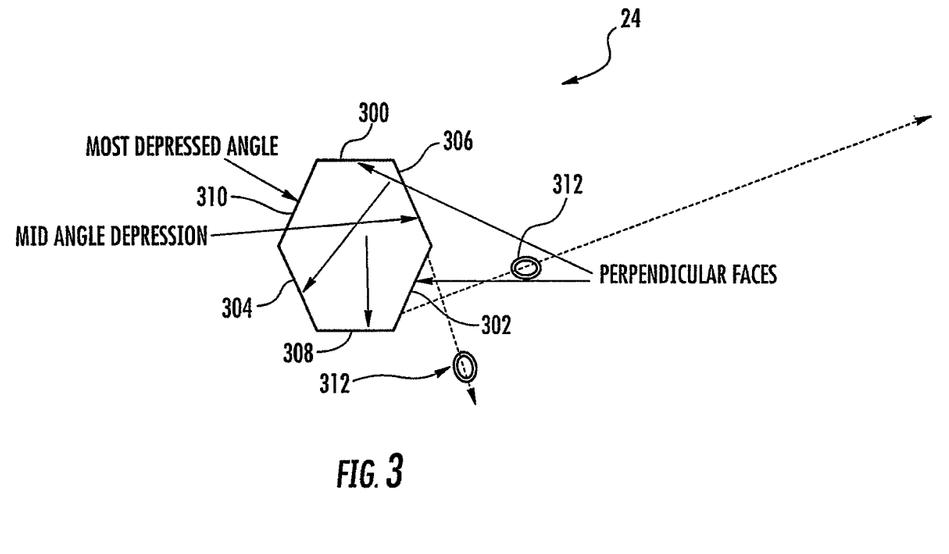
FIG. 3 illustrates a faceted scanning mirror operable for use within an apparatus for detecting location and range to an object according to an exemplary embodiment.

In example embodiments, the faceted scanning mirrors 24 are of a polygonal configuration and are operable for reflecting the optical signal through a window or lens element 25 into a specified area or field of regard. In example embodiments, the faceted scanning mirrors 24 are operable for reflecting the optical signal, separated by the optional combiner, through a window or lens element 25 into a specified area or field of regard. In example embodiments, the faceted scanning mirrors 24 further collect reflected optical signals from an object or player 30 and direct the reflected optical signal to the mirrored spinner 18. In example embodiments, the polygonal configuration of the faceted scanning mirrors 24 is that of a hexagon, thereby providing six faceted sides. In example embodiments and as best shown in FIG. 3, every other facet of the faceted scanning mirrors 24 is provided with a different angle of inclination for reflecting optical signals in correspondingly different offset arcs for producing a three dimensional image scan. In other example embodiments, every other facet of the faceted scanning mirrors 24 is angled downward thereby creating three depressions for high angular displacement range finding capabilities at a close to TART unit 12 range. More specifically, not all of the facets are positioned perpendicular to the rotation of the faceted scanning mirrors 24, only every other facet 300, 302, and 304 has a perpendicular face to the rotation. Advantageously, this particular configuration allows for a "full room" scan and tracking with the TART unit 12 being positioned at a high elevation within a room. In example embodiments, three facets 300, 302 and 304 are used for long distance range finding activity to allow the angular positional accuracy to be greater for the long distances, two facets 306 and 308 for the medium range situation and only one facet 310 is used for high angle, close to the device range finding. This particular configuration allows for scanning of up to about 120 degrees per face which is restricted to 90 degrees for "corner of a room" mounting. Further, this particular configuration provides three angle scan faces capable of producing a three dimensional (3D) image.

In example embodiments, the mirrored spinner 18 is rotatably driven by a motor 20 which in turn is controlled by the control circuitry 22. The mirrored spinner 18 directs the emitted optical signal to faceted scanning mirrors 24. The mirrored spinner 18 further directs reflected optical signals from an object or player 30 to the combiner 26.

A transceiver 28 is provided and connected to the optional combiner 26 or the mirrored spinner 18. If, after an optical signal is emitted into a field of regard, an object or player 30 is present, at least one reflective optical signal is reflected back along a second optical path to the faceted scanning mirrors 24 and about the mirrored spinner 18. In example embodiments, the at least one reflected optical signal is relayed to the combiner 26 wherein the at least one reflected optical signal is combined and relayed to the transceiver 28 which is operable for receiving a combined reflected optical signal and converting the combined reflected optical signal into electrical signals based upon the intensity of the reflection. In other example embodiments, the at least one reflected optical signal is relayed directly to the transceiver 28 which is operable for receiving a reflected optical signal and converting the reflected optical signal into electrical signals based upon the intensity of the reflection. In example embodiments, the transceiver 28 includes an integrated avalanche photo-diode (APD) receiver, as APD receivers are particularly well suited for detecting small amounts of light. The transceiver 28 is also operable for transmitting the electrical signals to the control circuitry 22 for a determination of presence, location and range of the object or player 30. Thereafter, the control circuitry 22 may decode the electrical signals received from the transceiver 28 and transmit the decoded electrical signals to the central controller 100 in the form of high resolution positional player data.

As shown in FIG. 1, connected to the control circuitry 22, the system 10 may include data storage 112 for data collection of information obtained from the TART unit 12. The data storage 112 may be any non-volatile data storage device, such as a hard drive, and a memory, which may be any volatile memory device, such as a random access memory (RAM) element. The data storage 112 and memory are used to store data captured by the TART unit 12.

As shown in FIG. 2, the TART unit 12 is configured to be mounted into a corner of a room or structure with the scanner set to provide a 90 degree scan along the entire room. However, it will be understood by those skilled in the art that the physical configuration may be adapted to provide a scan angle up to 360 degrees. In an example embodiment, the faceted scanning 24 mirrors may be configured to rotate through an angle of about 180 degrees.

Figure 5:
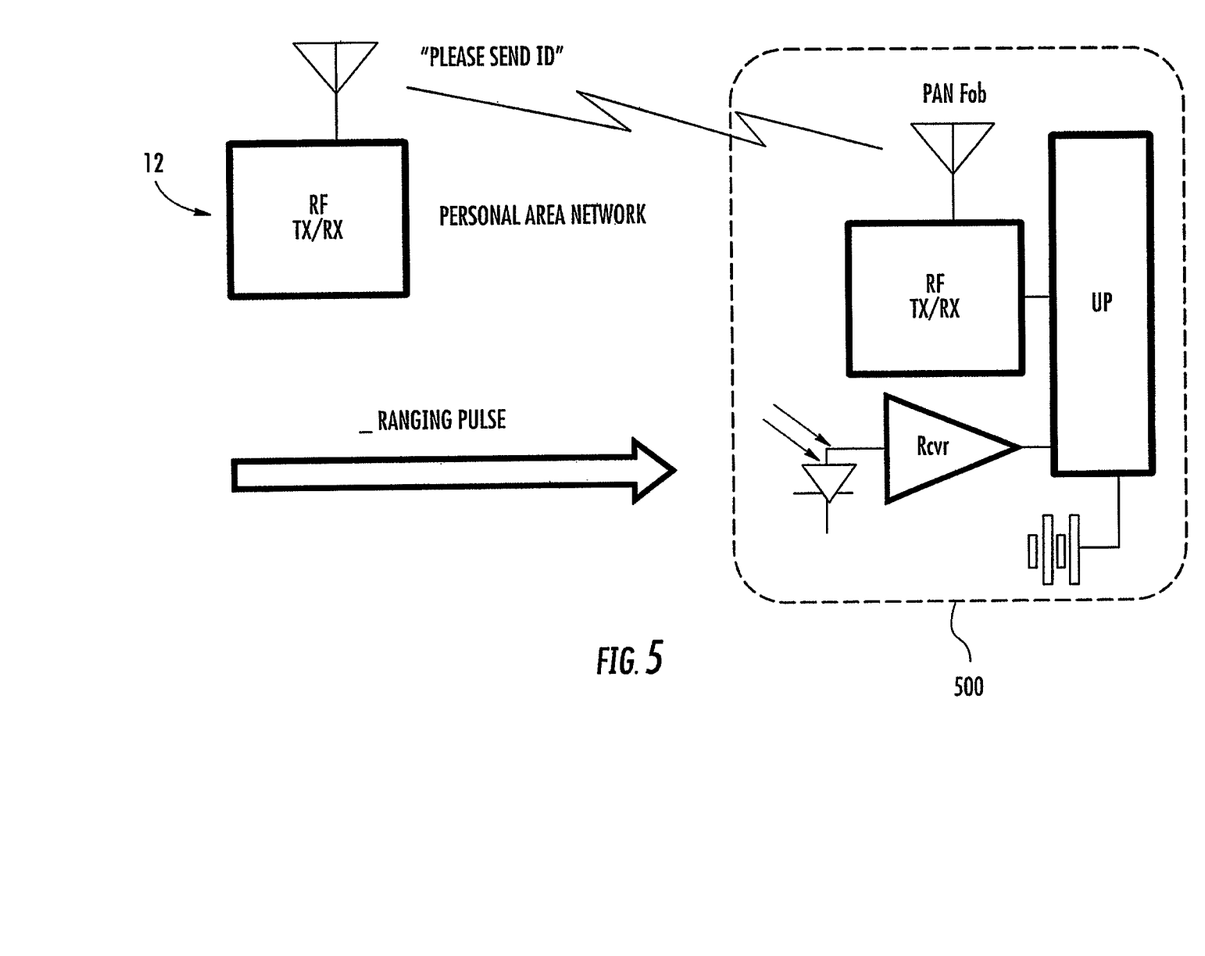
FIG. 5 illustrates a schematic diagram of a PAN cue and return device operable for use with a TART unit in accordance with an example embodiment of the present disclosure.

Referring now to FIG. 5, each object or player 30 may be outfitted with a mobile detection unit that can reflect or relay optical signals, laser or infrared (IR) signals, for example, such as in the PAN cue and return device 500 used by the U.S. military for realistic combat training. The PAN cue and return is an active detection unit that may be any a form of RFID with an integrated optical receiver interacting with the TART unit 12. Whenever a range outside a "no target" range is received, the system 10 may transmit a query to the player 30 to obtain a personal identification (PID) response. Only a player that had been lased the precise time previous to the RF cue responds with a hard coded PID. Once the TART unit 12 identifies the player 30, it no longer queries for a response. In addition to a PAN cue and return and in example embodiments, players 30 may be outfitted with at least one retro-reflector or "high reflectance bar code" on a helmet, hat, vest or arm band. In such cases, the TART unit 12 will track the presence, location and facing direction of the player 30 by detecting angle scan reflections of the at least one high reflectance barcode and look for variations in intensity until it could obtain the PID.

Advantageously, the use of the TART unit 12 enhances the angle resolution at long ranges by offsetting the ranging of each of the three long range faceted mirrors 300, 302 and 304 so that the ranges are interlaced. Further, the use of the TART unit 12 provides a significant improvement with regard to system set up. In order to initiate the system 10, the TART unit 12 needs to be mounted in one defined location (e.g., a corner) of a room and edge of room markers 312 need to be positioned in the remaining corners or in other defined locations. The TART 12 unit can thereafter calibrate and re-calibrate itself based upon the location of the markers 312. This task may be accomplished over an infrared data association (IRDA) link. Still further, player and object 30 distance measurements may be automatically and continuously re-calibrated by comparing captured player data to pre-defined edge of room marker data. As temperature or other affects change the dynamics of the rangefinder ramps, the range to object or player 30 is compared to the error in calculated distance to wall range so that the system 10 always stays in range calibration. Still further, the use of the optional fiber optic delay line 16 allows for a lower optical signal to be emitted from the laser module 14, thereby providing an eye safe condition.

Figure 4:
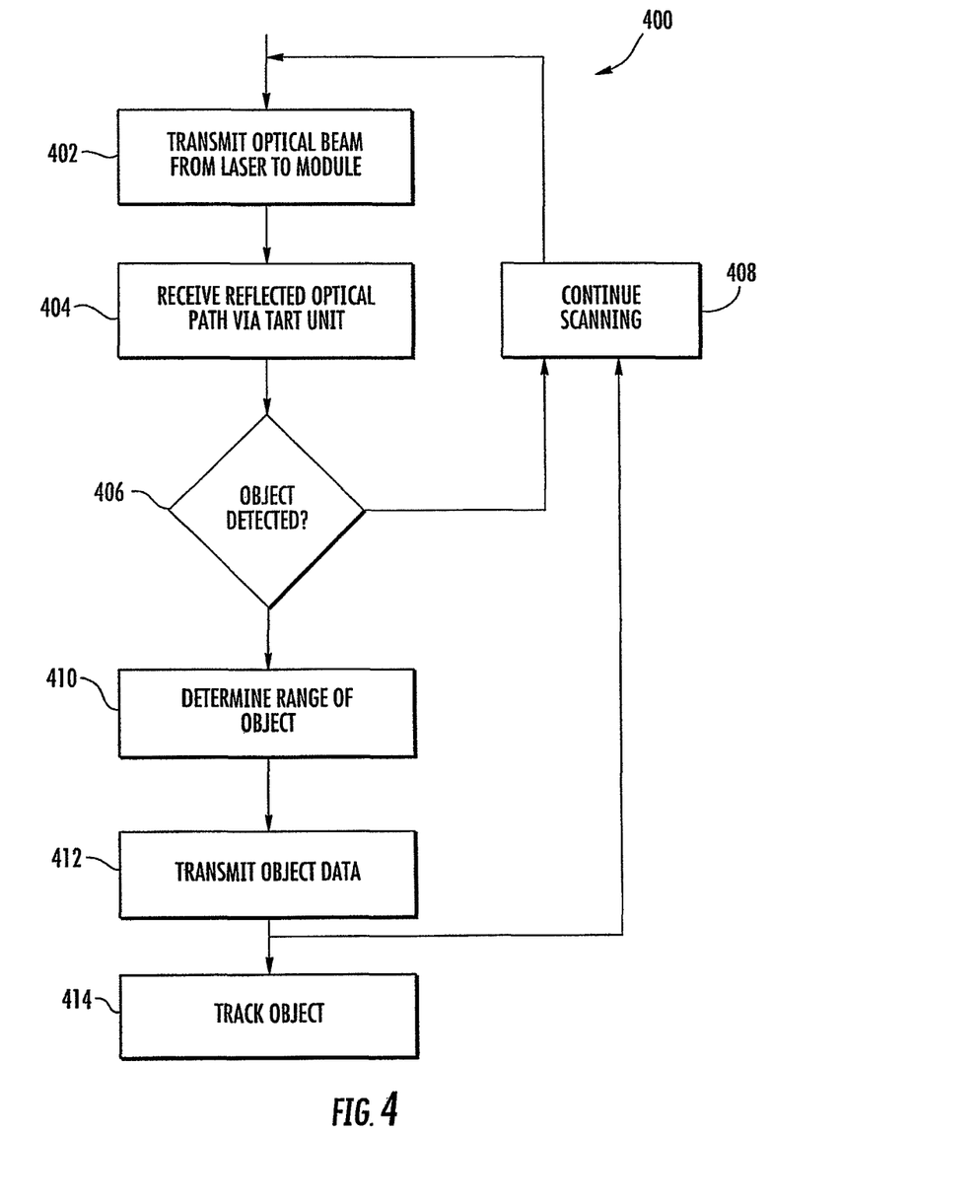
FIG. 4 illustrates a flow chart illustrating an exemplary operation of an apparatus as described herein.

Referring now to the FIG. 4 an exemplary method 400 of detecting a presence, location (e.g., azimuth and elevation, or pitch) and range of an object (or player) within a field of regard is illustrated. In example embodiments, the system 10, including the TART unit 12, can be operated in multiple modes to, for example, identify/detect an object presence and location (e.g., azimuth and elevation) and also to determine a range to the object and its facing direction. According to the method 400 and after initial set up and instrumentation, the system 10 transmits optical energy, such as an optical signal or beam of a laser module 14, along a first direction or optical path within the field of regard in block 402 to illuminate a portion of a room or structure. The laser module 14 can be any type of suitable laser device including, but not limited to, a gated continuous wave laser beam. The laser module 14 can be a single laser which is used to illuminate the field of regard for purposes of determining the presence of an object and the object's location and range. Alternatively, the laser module 14 can be a single laser which is used to illuminate the field of regard for purposes of determining the presence and location of an object, and which is then operated in a pulse mode to determine a range to the object. Alternatively, the laser module can be a pulsed laser used to illuminate the field of regard. Example embodiments include a single (e.g., common) optical receiving path for receiving optical energy that can be used by the TART unit 12 to determine the object presence, location and range. Other example embodiment include a dual or second optical path for receiving optical energy that can be used by the TART unit 12 to determine the presence, location and range of the object. The transmission of the optical beam can be in accordance with continuous wave phase or time-of-flight techniques (discussed below).

The optical energy used for object presence, location and range detection can be transmitted at any suitable frequency (wavelength) for detecting reflections including, but not limited to infrared (IR) frequencies. Alternately, a first frequency (wavelength) can be used for object presence detection and a second frequency (wavelength) can be used for location and range detection, provided the TART unit 12 is configured to receive reflections of the frequencies used for object presence, location and range detection. In example embodiments, where the optical beam used for location detection is a gated continuous wave optical beam transmitted during specified intervals, little or no energy is transmitted between intervals. If the optical energy reaches an object having a reflecting surface, for example, an optical or electro-optical target, reflected energy is received via the optical path of the TART unit 12 in block 404. Those skilled in the art will appreciate that such energy can be selected of sufficient amplitude (e.g., by way of empirical data) to be distinguishable from anticipated noise, such as reflections off the atmosphere.

Reflections received via an optical receiving path in block 404 may be input to the optional combiner 26 which in turn transmits the same to the transceiver with the APD receiver 28 for transmission to the control circuitry 22. Alternatively, the reflections may be directly relayed to the transceiver 26. Within the control circuitry 22 a determination is made as to the presence of an object within the field of regard by comparing the reflected energy signals against a predetermined threshold. If the signal data is greater than an established detection threshold, then it can be concluded that a reflecting object is present at a coordinate location in the field of regard which is determined as a function of the direction from which the reflected energy was received, as represented in block 406. If no object or player is detected, the process is repeated as shown in block 408.

In example embodiments, when a detection (e.g., amplitude) threshold is exceeded on an object's location, a range detection step can be performed at block 410. In example embodiments, a ranging pulse can then be transmitted toward the location in the field of regard at which the object was detected. In an example embodiment, the ranging pulse is transmitted within a ranging interval, during which the laser module 14 is not transmitting into the field of regard. Thus, a ranging pulse can be transmitted during a ranging interval, at a time between the specified optical energy transmission intervals, during which little or no energy is otherwise transmitted.

As discussed above the transmission of an optical beam at block 402 and ranging pulse can be generated in any suitable manner. The range finding operation of block 410 can, for example, be performed during an interval following a trailing (e.g., falling) edge of a continuous wave (CW) laser waveform. In such an example, the CW technique measures range by detecting the phase slip of an amplitude modulated optical signal. The phase slip can be measured by a phase detector or by quadrature detection. As will be understood by those skilled in the art, quadrature detection allows one to disregard any phase loss by calibrating the range after initial set up. In both cases, to avoid phase wrap and range ambiguity, the measuring range must not exceed one half wavelength of the modulated beam (accounting for the return path as well). Thus, the farthest distance that can be unambiguously measured is one half wavelength. For example, if a modulation oscillator frequency (25 MHz) is provided the following wavelength is produced:

$$\lambda = c/f = 3 \times 10^{8 m/s}/25 \text{ Mhz} \approx 12 \text{ m},$$

where c is the speed of light (m/s) and f is the quadrature modulation oscillation frequency (Hz)

This $\lambda \approx 12$ meters thus allows a measurement of up to 6 meters from the TART unit 12. Alternatively, the transmission at block 402 and range finding operation at block 410 may be performed by using a time-of-flight measuring technique which measures the time that a pulse of optical energy takes to emit out of a laser module 14, reflect off a player or object and return to the transceiver 28. In either example, an optical pulse can be generated by a pulse laser for use in range finding.

In an example embodiment, the ranging pulse can have a duration which is substantially less (e.g., an order of magnitude, or lesser or greater) than the off cycle of the CW laser, and can be such that spectral content of the pulse (e.g., MHz) is detectably different than the emission of the CW laser. The ranging pulse can be transmitted during the ranging interval; for example, during the interval between successive transmissions of the optical beam. The pulse can be transmitted as a narrow pulse of high frequency content. Those skilled in the art will appreciate that a narrower pulse can be used to provide increased range resolution.

The TART unit 12 receives the return of the ranging pulse via the second optical receiving path. Because the same optical path that was used to receive energy for detecting the object location is used for range detection, the position of the TART unit 12 in which the object's location was identified can be examined during the ranging operation to detect the return of the ranging pulse. In example embodiments, the range to the reflecting object can be determined in block 410 based on the time delay in receiving the return of the optical pulse.

At block 412, data converted from the reflected optical signals relative to presence, location and range is transmitted from control circuitry 22 of the TART unit 12 to a central controller 100. The central controller 100 may then transmit the data to either a data storage or memory device 112 or players outfitted with a PAN cue and return 110 at block 413. At block 413, the scanning process is repeated such that as the object moves within the field of regard, its movement is tracked by capturing periodic locations and ranges thereof at block 414. In example embodiments, the control circuitry 22 collects range data relative to an object and categorizes each range to a specific angle away from predefined "wall limits." In addition, the control circuitry 22 determines the best form of tracking by the rate of change or height to range of an object. This information may likewise be transmitted to the central controller 100.

The embodiments described above provide advantages over conventional devices and associated systems and methods. It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents. Furthermore, the foregoing description of the disclosure and best mode for practicing the disclosure are provided for the purpose of illustration only and not for the purpose of limitation—the disclosure being defined by the claims.

What is claimed is:

1. A detection system operable for detecting a player's presence, location and range within in an area, comprising:
    a central controller;
    at least one reflective source for reflecting at least one optical signal emitted from a laser;
    a detector for scanning a field of regard in signal communication with the central controller, the detector comprising
    a laser operable for emitting optical signals;
    a mirrored spinner; a rotatable faceted scanning mirror pattern disposed on and positioned about a rotational axis of the mirrored spinner, said faceted scanning mirror pattern being arranged in a hexagonal configuration with every other facet having a different angle of inclination for scattering the emitted optical signals in correspondingly different scan arcs;
    a lens through which the emitted optical signals which were scattered may be directed for producing a plurality of scan lines;
    a microcontroller connected to and operable for controlling the laser and the mirrored spinner;
    a combiner for separating and transmitting the emitted optical signals from the laser and for receiving and combining the reflected optical signals from the reflective source;
    a transceiver for receiving the reflected optical signals combined from the combiner, converting the reflected optical signals into reflected optical signal data and transmitting the reflected optical signal data to the microcontroller, and
    at least one reflective source for reflecting at least one optical signal emitted from a laser,
    wherein the emitted optical signals from the laser are emitted along an optical path and reflected by the at least one reflective source along the optical path back to the detector, and
    wherein the microcontroller receives and decodes the reflected optical signals and determines the presence, location and range of the reflective source,
    wherein the microcontroller collects range data relative to the reflective source and categorizes each range data to a specific angle away from predefined wall limits of a room and determines the best form of tracking the reflective source by analyzing the rate of change or height to range of the reflective source.

2. The detection system of claim 1, wherein the faceted mirror pattern comprises a polygonal configuration.

3. The detection system of claim 1, wherein the faceted mirror pattern comprises a hexagonal configuration.

4. The detection system of claim 1, wherein every other facet of the faceted mirror pattern is angled downward thereby creating three depressions for high angular displacement range finding capabilities.

5. The detection system of claim 1, further comprising a fiber optic delay line connected to the laser module, wherein the fiber optic delay line reduces blast noise caused by the laser module.

6. The detection system of claim 1, further comprising a mirrored spinner operable for carrying the faceted mirror pattern.

7. The detection system of claim 6, further comprising a motor operable for rotationally driving the mirrored spinner, said motor being connected to and controlled by the microcontroller.

8. The detection system of claim 1, wherein the laser module is a gated continuous wave laser and the emitted optical signals are a gated continuous laser beam.

* * * * *